(12) United States Patent
Bytnar et al.

(10) Patent No.: US 8,945,667 B2
(45) Date of Patent: Feb. 3, 2015

(54) ALKYLCELLULOSE AND SALT COMPOSITIONS FOR DUST CONTROL APPLICATIONS

(75) Inventors: Stephen C. Bytnar, Greeley, CO (US); Joshua J. Trujillo, Greeley, CO (US); Mark Steven Wolfe, Windsor, CO (US)

(73) Assignee: EnviroTech Services, Inc., Greeley, CO (US)

( * ) Notice: Subject to any disclaimer, the term of this patent is extended or adjusted under 35 U.S.C. 154(b) by 109 days.

(21) Appl. No.: 12/778,727

(22) Filed: May 12, 2010

(65) Prior Publication Data

US 2010/0297358 A1    Nov. 25, 2010

Related U.S. Application Data

(60) Provisional application No. 61/180,509, filed on May 22, 2009.

(51) Int. Cl.
*C09K 3/22*    (2006.01)
(52) U.S. Cl.
CPC .................................... *C09K 3/22* (2013.01)
USPC ..................... 427/136; 427/421.1; 427/427.1; 427/427.3

(58) Field of Classification Search
USPC ......... 427/136, 421.1, 427.1, 427.3; 252/88.1
See application file for complete search history.

(56) References Cited

U.S. PATENT DOCUMENTS

| | | | |
|---|---|---|---|
| 4,369,121 A * | 1/1983 | Callahan et al. | |
| 4,388,203 A * | 6/1983 | Nimerick et al. | |
| 4,622,245 A * | 11/1986 | Shimizu et al. | 427/230 |
| 5,135,674 A * | 8/1992 | Kuhajek et al. | |
| 6,096,373 A * | 8/2000 | Nachtman et al. | 427/136 |
| 6,806,298 B1 * | 10/2004 | Nachtman et al. | |
| 7,081,270 B2 * | 7/2006 | Hawkins et al. | 427/136 |
| 2002/0150540 A1 * | 10/2002 | Yoshikawa et al. | 424/43 |
| 2005/0194566 A1 * | 9/2005 | Schilling et al. | 252/88.1 |

FOREIGN PATENT DOCUMENTS

JP    45-19979 B  *  7/1970

* cited by examiner

*Primary Examiner* — Dah-Wei D Yuan
*Assistant Examiner* — Nga Leung V Law
(74) *Attorney, Agent, or Firm* — Kilpatrick Townsend & Stockton LLP

(57) ABSTRACT

A method of reducing dust generation from an aggregate surface is described. The method includes applying a dust suppression compound to the aggregate surface. The dust suppression compound may be made from an aqueous mixture of an alkylcellulose compound and a halogen containing salt.

16 Claims, 2 Drawing Sheets

ALKYLCELLULOSE AND SALT COMPOSITIONS FOR DUST CONTROL APPLICATIONS

CROSS REFERENCE TO RELATED APPLICATION

This application is a nonprovisional of, and claims the benefit of the filing date of, U.S. Provisional Patent Application No. 61/180,509, entitled "ALKYCELLULOSE AND SALT COMPOSITIONS FOR DUST CONTROL APPLICATIONS," filed May 22, 2009 by Stephen C. Bytnar et al., the entire disclosure of which is incorporated herein by reference for all purposes.

BACKGROUND OF THE INVENTION

Large amounts of soil are excavated, piled and exposed during the construction of roads and buildings. Dry conditions and even light winds can carry away exposed portions of the soil to create airborne dust that contributes to atmospheric pollution. Regulatory bodies charged with controlling environmental pollution, including the U.S. Environmental Protection Agency, are requiring stricter pollution controls to reduce the levels of airborne dust generated by exposed construction soil.

One dust suppression method is to cover the exposed soil with a plastic tarp. This method has a number of drawbacks, including the cost of materials and the labor involved in covering and uncovering the soil with the tarp. Tarps are especially impractical for covering large areas of exposed soil typically created by road construction. Tarps are also generally inappropriate for soil being actively worked during the construction.

Another dust suppression method is to wet the exposed soil with water. The water acts as a temporary binder that holds together loose soil aggregates that may otherwise become airborne. However, water can quickly leave the exposed dirt surface through a combination of soil absorption and surface evaporation. Thus, water must be frequently applied to the dirt for dust suppression. In hot, dry environments where water quickly evaporates, the dirt may have to be wetted on an almost continuous basis.

One technique to reduce the rate at which the water evaporates from the soil is to provide a dissolved salt in the water. The salt reduces the vapor pressure of the aqueous salt water solution, which reduces the rate at which the solution evaporates from the soil. The lower evaporation rate permits less frequent applications of the solution on the exposed soil. However, salt water solutions also have a number of drawbacks as dust suppression compounds. The salt introduces an additional environmental pollutant that can harm the surrounding environment, especially surrounding vegetation. Water soluble salts are also easily washed away from the exposed soil surface by rainfall, which can carry them to nearby water resources. Thus, there is a need for new methods and compositions to suppress dust from construction site soil. This and other topics are addressed below.

BRIEF SUMMARY OF THE INVENTION

A dust suppression composition is described that combines an alkylcellulose compound with an aqueous salt solution. The composition can wet exposed surfaces of soil to prevent loose aggregate particles on the surface from becoming airborne. The alkylcellulose keeps the salt bound closer to the exposed soil surfaces and makes it more difficult for rainwater to wash away the salt from the surface. When the salts are hygroscopic, they can attract moisture from the surrounding air and soil to the exposed surface, keeping the surface wet for even longer periods.

The alkylcellulose containing dust suppression compositions can be applied to exposed construction soil, unpaved road surfaces, etc., with less frequency, and in smaller amounts, than a pure aqueous salt solution (i.e., a brine solution). The reduced application frequency and quantities realize significant cost savings in the form or reduced labor for applying the compositions, as well as reduced transportation costs for moving the composition to the application site. The reduced application frequency also has substantial environmental benefits by reducing the amount of salt applied to the soil, and the extent of the migration of the salt from the application site.

Embodiments include methods of reducing dust generation from an aggregate surface. The methods may include applying a dust suppression compound to the aggregate surface. The dust suppression compound may include an aqueous mixture of an alkylcellulose compound and a halogen containing salt. Examples of the alkylcellulose compound include hydroxyethylcellulose and carboxymethylcellulose. Examples of the halogen containing salt include hygroscopic chloride ion-containing salts such as magnesium chloride and calcium chloride.

Embodiments further include methods of preventing the generation of dust from particulate material at a soil surface. The methods may include the steps of transporting a dust suppression compound to the soil surface, and spraying the dust suppression compound on the particulate material. The dust suppression compound may include an aqueous mixture of an alkylcellulose and a halogen containing salt.

Embodiments may also include dust suppression solutions. The solutions may include water, an alkylcellulose, and a hygroscopic, chloride-containing salt. The dust suppression solutions may have a viscosity of about 20 cps to about 300 cps at 25° C.

Additional embodiments and features are set forth in part in the description that follows, and in part will become apparent to those skilled in the art upon examination of the specification or may be learned by the practice of the invention. The features and advantages of the invention may be realized and attained by means of the instrumentalities, combinations, and methods described in the specification.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Dust Suppression Compositions

Figure 1:
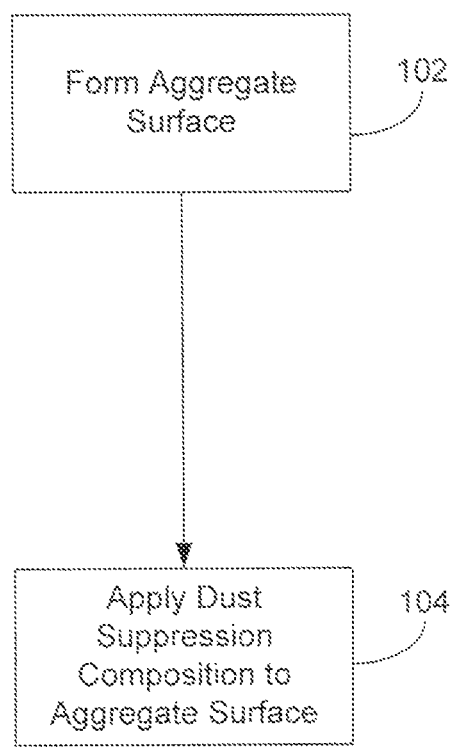
FIG. 1 is a flowchart illustrating selected steps in a method of reducing dust generation from construction soil according to embodiments of the invention.

Dust suppression compositions are described that include one or more alkylcellulose compounds and one or more salts dissolved in an aqueous solution. The alkylcelullose compounds may include cellulose ether derivatives such as hydroxyalkylcellulose compounds and carboxyalkylcellulose compounds. Specific examples of alkylcellulose compounds include hydroxyethylcellulose (HEC) and carboxymethylcellulose (CMC).

The alkylcellulose compounds may be polymeric compounds that can have a wide range of average molecular weights for even a single species of alkylcellulose. For example, hydroxyethylcelluloses typically have average molecular weights that range from 90,000 to about 1,000,000 or more. For dust suppression applications, alkylcellulose polymers with higher average molecular weights are more effective at holding the salt close to the soil surface where the dust suppression composition was first applied. Thus, for example, when an HEC polymer is selected as the alkylcellulose compound it may have an average molecular weight of about 1,000,000 g/mol, or more.

The higher molecular weight alkylcellulose polymers are typically solids or viscous liquids at room temperature, and can significantly increase the viscosity of an aqueous solution. If the viscosity is too high, the dust suppression composition becomes difficult to apply to the soil using application techniques like spraying. The alkylcelluloses may be selected and added at concentrations that do not increase the viscosity of the dust suppression composition to more than about 1000 centipoise (cps) at 25° C. For example, the added alkylcellulose may increase the viscosity of the dust suppression composition to about 20 cps to 300 cps at 25° C.

Increasing the viscosity of the brine solution is believed to help keep the dust suppression composition concentrated close to the surface where it was applied. For example, when the surface is a roadbase, a substantial portion of the applied dust suppression composition remains in the top 0.25 inch depth of the surface. In addition to increasing the viscosity, the alkylcellulose polymers also help keep the salts in the brine solution close to the surface by forming a polymer network that binds the salt to the soil surface. The effectiveness of this polymer network is believed to increase as the water in the applied dust suppression composition evaporates from the soil surface to further concentrate the mixture of salt and alkylcellulose polymer. The polymer network can significantly slow the rate at which the salt leeches from the soil surface when subsequent moisture is introduced to the surface (e.g., rain).

The concentration of the alkylcellulose used in the dust suppression composition may depend on the type and size of alkylcellulose polymers used, but generally ranges from about 0.05 wt. % to about 0.5 wt. % of the total weight of the composition. In some examples, the concentration may exceed about 0.5 wt. % of the composition. Specific examples of alkylcellulose concentrations include about 0.05 wt. %, about 0.10 wt. %, about 0.15 wt. %, about 0.20 wt. %, about 0.25 wt. %, about 0.30 wt. %, about 0.35 wt. %, about 0.40 wt. %, about 0.45%, and about 0.50 wt. %, among other concentrations.

The alkylcellulose compounds may be chosen for their solubility in an aqueous salt solution (sometimes referred to as "brine tolerant" celluloses). Many cellulose polymers have difficultly dissolving in salt solutions, so the alkylcellulose compounds used in the present dust suppression compositions may be selected for their ability to dissolve quickly in aqueous salt solutions. Examples of brine tolerant alkylcelluloses include HEC and CMC.

The dissolved salt used in the dust suppression composition may be alkali metal halide, an alkali earth metal halide, or combinations of both. The halide salt may be a chloride-ion containing salt. Specific examples of the dissolved salts include sodium chloride (NaCl), potassium chloride (KCl), magnesium chloride ($MgCl_2$) and calcium chloride ($CaCl_2$), among other salts. The dissolved salt may be hygroscopic, attracting moisture from the surrounding environment. When hygroscopic salts are applied to a soil surface, they can draw moisture to the surface from the overlying air and underlying bulk soil. This increases wetness at the exposed soil surface and reduces the number of surface aggregate particles carried away as airborne dust. Hygroscopic salts include alkali earth metal chlorides like magnesium chloride and calcium chloride.

The concentration of the dissolved salt in the aqueous solution may range from about 10 wt. % to about 40 wt. % of the total weight of the dust suppression composition. Specific examples include dust suppression compositions with salt concentrations of about 10 wt. %, about 15 wt. %, about 20 wt. %, about 25 wt. %, about 30 wt. %, about 35 wt. %, and about 40 wt. %. In some embodiments, the salt concentration may be less than about 10 wt. %, and in other embodiments the salt concentration may be higher than about 40 wt. %.

The water, salt, alkylcellulose compound, and any additional ingredients may be mixed in a variety of ways to make the dust suppression composition. Examples include mixing a liquid or powdered alkylcellulose compound into a brine solution of water and the dissolved salt. Another example involves combining the alkylcellulose compound and salt and adding the powdered mixture to the water. In some embodiments, the alkylcellulose compound and salt may be added to water that is already present at the application site, avoiding some of the transport costs to bring the dust suppression composition to the site.

Dust Reduction Methods

FIG. 1 shows a flowchart with selected steps in a method 100 of reducing dust generation from an aggregate surface. The method 100 includes forming an aggregate surface 102 that can generate airborne aggregate particles. The aggregate surface may be formed by excavating, exposing, piling, or otherwise moving sand, soil, loose rock, or other aggregate material to create exposed surfaces that can generate particulates (commonly referred to as dust) capable of being carried by air currents to another location. The aggregate surface may also be an unimproved transportation surface, such as an unpaved road. These particulates may be of large enough size to quickly settle in a new location, or may be small enough to be suspended in the air for several hours or longer.

Method 100 further includes applying the dust suppression composition to the aggregate surface 104. The dust suppression composition wets the exposed aggregate surface, causing the particles to bind together and reducing the amount of loose aggregate particles capable of becoming airborne dust. The dust suppression compound is an aqueous mixture of an alkylcellulose and a halogen containing salt. Specific examples of the dust suppression composition may include an aqueous magnesium chloride solution that contains about 10 wt. % to about 40 wt. % $MgCl_2$, and about 0.05 wt % to about 0.5 wt. % of a high molecular weight hydroxyethylcellulose polymer.

Figure 2:
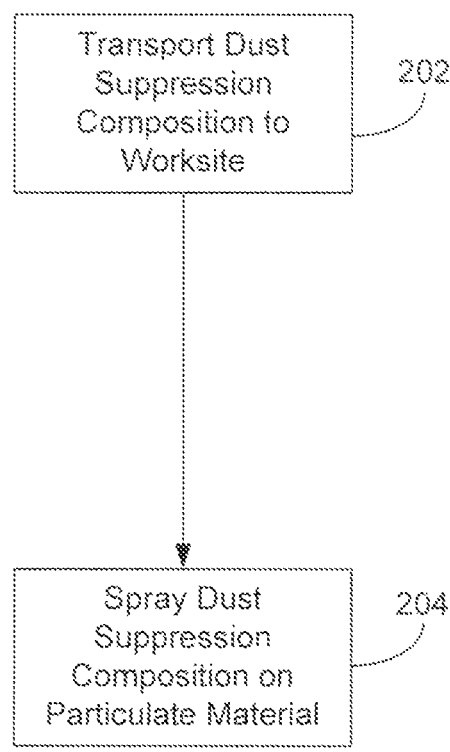
FIG. 2 is a flowchart illustrating selected steps in a method of preventing dust from particulate materials at a worksite according to embodiments of the invention.

Referring now to FIG. 2, another flowchart with selected steps in a method 200 of preventing dust generation from particulate material at a worksite is shown. The method 200 includes the step of transporting the dust suppression composition to the worksite 202. Transportation may involve moving an already prepared aqueous solution of the dust suppression composition to the worksite from a remote preparation area. Alternatively, transportation may involve moving the undissolved salt and alkylcellulose compound to the worksite in powdered form, and mixing these components with water that is already present at the worksite.

The method 200 may also include spraying the dust suppression composition on the particulate material 204. The particulate material may be soil that has been moved, exposed, or both, during the construction of a road, building, or some other structure at the worksite. For example, the particulate material may be part of the topside surface of a roadbase that forms the foundation for a road. The particulate material may also be a soil surface of an already existing road (e.g., an unpaved road). The dust suppression composition may be sprayed on the particulate material at a coverage level of about 0.05 gal/ft² to about 0.2 gal/ft² (e.g., 0.05 gal/ft², 0.06 gal/ft². 0.07 gal/ft², etc.). These are significantly lower coverage levels than typically used for dust suppression solutions made exclusively from brine solutions, where two times or more solution is typically used to cover the same area. The lower coverage levels of the dust suppression compositions reduces the amount of chloride salts contaminating the environment, and also reduces the carbon footprint for the transportation fuels needed to deliver the compositions to the particulate material.

The dust suppression composition may be sprayed from a spraying unit on a vehicle configured to transport and spray the composition on the target surface. The spraying unit may include a pump or other type of pressure actuator that forces the aqueous dust suppression composition through a spray nozzle that causes the composition to fan out across an area of the particulate material. Typically, the spraying unit is configured to spray fluids having a viscosity at or slightly higher than the viscosity of water at room temperature (i.e., about 1 cps). When the viscosities get too high (e.g., greater than 1000 cps) conventional spraying units can become unsuitable for spraying the fluid. However, higher viscosities usually increase the duration which the dust suppression composition can hold salts close to the exposed particulate material. Thus, there is a tension between the benefits of higher viscosity dust suppression compositions and the ability to practically apply them to the exposed particulate material. These competing factors may be balanced by using a dust suppression composition that has a viscosity in the range of about 20 cps to about 300 cps. Compositions with viscosities in this range can be efficiently sprayed with conventional spray equipment, while also holding the salt close to the exposed particulate material for substantially longer periods of time than a pure brine solution.

The viscosity of the solution may be primarily set by the selection and concentration of an alkylcellulose compound in the aqueous salt solution. When the alkylcellulose compounds are polymers, the viscosity of the compounds depends on the average molecular weight of the polymers, with viscosity and molecular weight generally increasing in tandem. Pure alkylcellulose polymers are generally solids or viscous liquids at room temperature, so dissolving them in an aqueous solution usually increases the viscosity of the solution. The viscosity of the solution generally increases with the concentration of the alkylcellulose polymer, although not necessarily in a linear fashion. Typically, the dust suppression compositions described here contain about 0.05 wt. % to about 0.5 wt. % alkylcellulose compounds.

EXAMPLES

Examples of how to make dust suppression compositions according to embodiments of the invention are described. These examples start with an aqueous brine solution containing 30 wt. % $MgCl_2$, and 70 wt. % water. In one example, 0.05 wt. % of a high-molecular weight (e.g., 1,000,000 g/mol or more) hydroxyethylcellulose (HEC) polymer is added to the magnesium chloride brine solution. The HEC and brine solution was agitated for 3 hours to allow the HEC polymer time to fully hydrate in the aqueous solution. The resulting dust suppression composition had a viscosity of 158 cps measured at 60° F. By comparison, the pure 30 wt. % $MgCl_2$ brine solution had a viscosity of 55 cps at the same temperature.

In another example, 0.20 wt. % of a mid-sized HEC polymer (e.g., about 300,000-500,000 g/mol) was added to same 30 wt. % $MgCl_2$ brine solution, and allowed to hydrate for 3 hours. The resulting dust suppression composition had a viscosity of 211 cps at 60° F.

In still another example, 0.50 wt. % of a low molecular weight carboxymethylcellulose (CMC) polymer was added to the same 30 wt. % $MgCl_2$ brine solution. The resulting viscosity of the dust suppression composition was 216 cps at 60° F.

The three alkylcellulose polymers described in the examples above were added in the same concentrations to an aqueous brine solution made from 32 wt. % $CaCl_2$ and 68 wt. % water. The resulting dust suppression compositions had similar viscosities at 60° F. to the dust suppression compositions made with the 30 wt. % $MgCl_2$ brine solution.

Viscosity measurements were also made for additional dust suppression compositions having varied wt. % concentrations of a hydroxyethylcellulose polymer (HEC), a mid-molecular weight carboxymethylcellulose polymer (CMC1), and a high-molecular weight carboxymethylcellulose polymer (CMC2), in both magnesium chloride and calcium chloride brines. All viscosity measurement were taken at 68° F. These viscosity measurements are summarized in Table 1 below:

TABLE 1

Viscosity of HEC and CMC Polymers in $MgCl_2$ and $CaCl_2$ Brines

| Product | Viscosity (Centipoise—cps) |
|---|---|
| 30% $MgCl_2$ | 52 |
| 30% $MgCl_2$ + 0.05% HEC | 93 |
| 30% $MgCl_2$ + 0.10% HEC | 128 |
| 30% $MgCl_2$ + 0.15% HEC | 160 |
| 30% $MgCl_2$ + 0.20% HEC | 205 |
| 30% $MgCl_2$ + 0.25% HEC | 348 |
| 30% $MgCl_2$ + 0.05% CMC1 | 60 |
| 30% $MgCl_2$ + 0.10% CMC1 | 77 |
| 30% $MgCl_2$ + 0.15% CMC1 | 84 |
| 30% $MgCl_2$ + 0.20% CMC1 | 102 |
| 30% $MgCl_2$ + 0.25% CMC1 | 254 |
| 30% $MgCl_2$ + 0.05% CMC2 | 100 |
| 30% $MgCl_2$ + 0.10% CMC2 | 125 |
| 30% $MgCl_2$ + 0.15% CMC2 | 160 |
| 30% $MgCl_2$ + 0.20% CMC2 | 415 |
| 30% $MgCl_2$ + 0.25% CMC2 | 1000 |
| 30% $CaCl_2$ | 47 |
| 30% $CaCl_2$ + 0.05% HEC | 87 |
| 30% $CaCl_2$ + 0.10% HEC | 122 |
| 30% $CaCl_2$ + 0.15% HEC | 151 |
| 30% $CaCl_2$ + 0.20% HEC | 195 |
| 30% $CaCl_2$ + 0.25% HEC | 334 |
| 30% $CaCl_2$ + 0.05% CMC1 | 57 |
| 30% $CaCl_2$ + 0.10% CMC1 | 72 |
| 30% $CaCl_2$ + 0.15% CMC1 | 81 |
| 30% $CaCl_2$ + 0.20% CMC1 | 95 |
| 30% $CaCl_2$ + 0.25% CMC1 | 250 |
| 30% $CaCl_2$ + 0.05% CMC2 | 96 |
| 30% $CaCl_2$ + 0.10% CMC2 | 119 |
| 30% $CaCl_2$ + 0.15% CMC2 | 149 |

TABLE 1-continued

Viscosity of HEC and CMC Polymers in MgCl$_2$ and CaCl$_2$ Brines

| Product | Viscosity (Centipoise—cps) |
|---|---|
| 30% CaCl$_2$ + 0.20% CMC2 | 400 |
| 30% CaCl$_2$ + 0.25% CMC2 | 952 |

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the compound" includes reference to one or more compounds and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method of reducing dust generation from an aggregate surface, the method comprising applying a dust suppression composition to the aggregate surface, wherein the dust suppression composition comprises an aqueous mixture of an alkylcellulose compound and a halogen containing salt and has a viscosity of about 100 cps to about 1000 cps at 68° F., wherein the alkylcellulose compound comprises about 0.05 wt. % to about 0.50 wt. % of the dust suppression composition, and wherein the halogen containing salt comprises about 25 wt. % to about 40 wt. % of the dust suppression composition and the halogen containing salt is a hygroscopic salt.

2. The method of claim 1, wherein the alkylcellulose compound comprises hydroxyethylcellulose.

3. The method of claim 1, wherein the alkylcellulose compound comprises carboxymethylcellulose.

4. The method of claim 1, wherein the halogen containing salt comprises a chloride anion.

5. The method of claim 1, wherein the halogen containing salt comprises an alkali earth metal cation.

6. The method of claim 1, wherein the halogen containing salt is selected from the group consisting of magnesium chloride and calcium chloride.

7. The method of claim 1, wherein the aggregate surface comprises soil.

8. The method of claim 1, wherein the aggregate surface comprises an unpaved roadway.

9. A method of preventing the generation of dust from particulate material at an soil surface, the method comprising: transporting a dust suppression composition to the soil surface; and spraying the dust suppression composition on the particulate material, wherein the dust suppression composition comprises an aqueous mixture of an alkyl cellulose compound and a halogen containing salt and has a viscosity of about 100 cps to about 1000 cps at 68° F., wherein the alkylcellulose compound comprises about 0.05 wt. % to about 0.50 wt. % of the dust suppression composition, and wherein the halogen containing salt comprises about 25 wt. % to about 40 wt. % of the dust suppression composition and the halogen containing salt is a hygroscopic salt.

10. The method of claim 9, wherein the dust suppression composition is transported to the soil surface by a vehicle comprising a fluid storage tank to hold the dust suppression composition.

11. The method of claim 10, wherein the vehicle also comprises a spraying unit to spray the dust suppression composition.

12. The method of claim 9, wherein the soil surface comprises an unpaved road surface.

13. The method of claim 9, wherein the alkylcellulose compound comprises hydroxyethylcellulose or carboxymethylcellulose.

14. The method of claim 9, wherein the halogen containing salt is selected from the group consisting of magnesium chloride and calcium chloride.

15. The method of claim 1, wherein the dust suppression composition is applied to the aggregate surface at a coverage level from about 0.05 gal/ft$^2$ to about 0.2 gal/ft$^2$.

16. The method of claim 9, wherein the dust suppression composition is sprayed on the particulate material at a coverage level from about 0.05 gal/ft$^2$ to about 0.2 gal/ft$^2$.

* * * * *